United States Patent [19]

Angeline

[11] Patent Number: 5,363,994
[45] Date of Patent: Nov. 15, 1994

[54] AQUEOUS SILANE COUPLING AGENT SOLUTION FOR USE AS A SEALANT PRIMER

[75] Inventor: Barry D. Angeline, Cleveland Heights, Ohio

[73] Assignee: Tremco, Inc., Beachwood, Ohio

[21] Appl. No.: 904,422

[22] Filed: Jun. 26, 1992

[51] Int. Cl.$^5$ .............................................. B67D 3/00
[52] U.S. Cl. ............................ 222/529; 106/287.11; 106/287.16
[58] Field of Search ............ 106/287.11, 287.16; 528/30, 38; 222/490, 494, 529

[56] References Cited

U.S. PATENT DOCUMENTS

| | | | |
|---|---|---|---|
| 3,779,794 | 12/1973 | De Santis | 117/72 |
| 4,173,553 | 11/1979 | Haluska | 260/29.2 |
| 4,388,437 | 6/1983 | Ona | 524/588 |
| 5,053,081 | 10/1991 | Jacob | 106/287.11 |
| 5,073,195 | 12/1991 | Cuthbert et al. | 106/2 |

FOREIGN PATENT DOCUMENTS

| | | |
|---|---|---|
| 0260661 | 3/1988 | European Pat. Off. . |
| 2615197 | 11/1988 | European Pat. Off. . |
| 0332344 | 9/1989 | European Pat. Off. . |
| 0478154 | 4/1992 | European Pat. Off. . |

OTHER PUBLICATIONS

European Search Report, Application No. 93110139.8, dated 21 Oct. 1993.
Abstract of Japanese Application No. J60203676 from a Derwent Patent Search.
Abstract of Japanese Application No. J04003166 from a Derwent Patent Search.

*Primary Examiner*—D. S. Nakarani
*Attorney, Agent, or Firm*—David P. Dureska; Gunther J. Evanina

[57] ABSTRACT

An aqueous primer composition for facilitating and promoting good adhesion across an interface between a nonporous substrate and a polymeric coating composition contains from about 0.05 to about 0.3 parts by weight of an amimopropylsilane or a mercaptopropylsilane per 100 parts by weight of water and, optionally to facilitate adhesion under wet conditions, up to about 0.4 parts by weight of a hydrophobic silane per 100 parts by weight of water and aminopropylsilane or mercaptopropylsilane. The primer composition is nontoxic, nonflammable and free or substantially free of any environmentally undesirable volatile organic components. In accordance with a preferred aspect of the invention, the primer composition includes an effective amount of a conventional surfactant sufficient to uniformly wet the surface of the substrate to enable uniform dispersion of the silane coupling agent over the surface. The primer composition is also preferably adjusted to a pH of from about 2.0 to about 5.5 to inhibit condensation or oligomerization of the silane coupling agent and thereby increase the useful shelf-life of the composition.

9 Claims, No Drawings

AQUEOUS SILANE COUPLING AGENT SOLUTION FOR USE AS A SEALANT PRIMER

FIELD OF THE INVENTION

The invention relates to an aqueous based composition containing a silane coupling agent used to promote adhesion between a polymer and a smooth inorganic substrate such as glass or metal and, more particularly, the invention relates to an aqueous primer system having a silane coupling agent which is used to facilitate good adhesion between a moisture curable sealant and a glass or metal substrate.

BACKGROUND OF THE INVENTION

Conventional primer systems for use with moisture curable sealant compositions generally contain a large amount of volatile organic solvent, a film former, pigment and silane coupling agent. The coupling agent is typically an aminosilane, mercaptosilane, or isocyanatosilane which reacts, for example, with free isocyanate groups in the sealant and with free hydroxyl, oxide, or silanol groups on the substrate to form a bridge between the sealant and the substrate. The conventional sealant primer systems provide good adhesion across the substrate-sealant interface and are convenient to use because they dry quickly. However, recent concern over the emission of volatile organic compounds (VOC) into the environment has resulted in pending legislation which would essentially mandate the elimination of volatile organic compounds whenever possible.

In addition to the problems relating to compliance with pending VOC legislation, the use of conventional solvent based sealant primer systems requires the implementation of precautionary procedures and the incurment of potential risks due to the toxicity and flammability of the organic solvents. Accordingly, organic based sealant primer systems are undesirable and an aqueous based sealant primer system which has a substantially reduced organic solvent content or which is preferably free of volatile organic compounds, and which provides comparable adhesion across the substrate-sealant interface, would be highly preferred.

SUMMARY OF THE INVENTION

The invention pertains to an aqueous primer solution containing a silane coupling agent which is used to facilitate adhesion of a polymer to a nonporous inorganic substrate such as metal or glass. The silane coupling agent has an amino or mercapto functional group which is capable of reacting with functional groups of the polymer, and also has one or more hydrolyzable groups which react with free hydroxyl groups on the surface of the substrate. The silane coupling agent, when uniformly dispersed on the surface of a nonporous substrate, forms an ultra-thin layer capable of reacting with both the substrate and a polymer sealant composition to provide an adhesive bridge therebetween.

The primer composition of the invention has been found to facilitate excellent adhesion between a nonporous substrate and a polymer. In particular, when tested with either glass or automotive top coated metals, the primer promotes good adhesion with typical polyurethane sealant compositions to provide a water tight seal between a glass windshield and a windshield pinchweld. The primer remains stable and performs well under a variety of adverse conditions including high and low temperature exposure, high humidity and freeze-thaw cycling, and meets or exceeds lap-shear strength standards of the automotive industry.

The silane coupling agents of the invention are represented by the formula $$A-R^1-Si(R^2)_a(X)_{3-a}$$

where A is an amino or mercapto functional group, $R^1$ is an alkylene radical having from 1 to about 8 carbon atoms, each $R^2$ is independently an alkyl radical having from 1 to about 8 carbon atoms, each X is independently an alkoxy radical having from 1 to about 8 carbon atoms or chlorine, and a is 0, 1 or 2. The amount of silane coupling agent used is generally in the range from about 0.05 to about 0.3 parts by weight per 100 parts by weight of water.

In accordance with a preferred aspect of the invention, up to 0.4 parts by weight of a hydrophobic agent is utilized in the solution per 100 parts by weight of water to resist decoupling of the silane coupling agent from the substrate when the coated substrate is exposed to moisture and humidity. The use of a hydrophobic agent such as methyltrimethoxysilane will also tend to retard rust formation by inhibiting water from penetrating to the surface of a metal substrate. The hydrophobic agent utilized with the invention is a hydrophobic silane generally represented by the formula $$(R^3)_b Si(Y)_{4-b}$$

where each $R^3$ is independently an alkyl, alkenyl or aryl radical having up to about 8 carbon atoms, each Y is independently an alkoxy radical having up to about 8 carbon atoms or chlorine.

In order to promote uniform dispersion of the coupling agent and hydrophobic agent over the surface of the substrate, the primer solution preferably contains an effective amount of a conventional surfactant to allow the aqueous primer solution to wet the surface of the substrate.

To promote long term stability and extended shelf-life of the primer solution, the pH of the primer solution is preferably adjusted to a value of between about 2.0 to about 5.5.

The primer solutions of the invention facilitate good adhesion between a nonporous substrate and a suitable polymer composition with reduced organic solvent or even without organic solvents. The invention, therefore, provides a primer system which complies with pending VOC legislation. Moreover, the primer solution of the invention is nontoxic and nonflammable thereby reducing risks and concerns relating to workers safety and property damage.

Polymer compositions which can be bonded to a nonporous substrate with the primer compositions of the invention generally include any polymer having free functional groups, such as isocyanate groups, capable of reacting with the functional groups, i.e. an amino or mercapto group, of the silane coupling agent. Particularly preferred polymer compositions for use with the invention include, for example, moisture curable polyurethane polymers having terminal isocyanate groups.

Primer solutions in accordance with the preferred embodiments of the invention can be stored for prolonged periods of time, in excess of several months, without any significant adverse affect on their ability to facilitate and promote adhesion between a nonporous substrate and a suitable polymeric coating. The preferred primer solutions of the invention have also been found to exhibit good stability when exposed to very high and to very low temperatures.

When, as in accordance with a preferred mode of the invention, the silane coupling agent has an amino functionality as opposed to a mercapto functionality, the primer solution is substantially odorless, thereby reducing worker stress and discomfort and substantially eliminating the risk of customer disapproval based on odor.

Unlike most conventional primer solutions which are black due to the incorporation of carbon black and/or other pigments, the primer solutions of the present invention are generally clear. Consequently, inadvertent spills, splashes, or speckles on unintended surfaces are not as offensive or damaging to the appearance of the article or portions thereof to which the solution was inadvertently applied.

The primer compositions of the invention are generally easier to prepare than conventional primer compositions containing organic solvents, and carbon black pigments. In particular, conventional primer compositions must be prepared under a nitrogen blanket to prevent moisture in the air from contaminating the solution and causing the silane coupling agents to prematurely hydrolyze and condense or oligomerize. In contrast, the primer compositions of the invention incorporate silane coupling agents which do not condense or oligomerize in a dilute aqueous solution, and therefore the compositions are unaffected by moisture in the air and can be prepared in an open vessel exposed to the atmosphere. By avoiding the need for a nitrogen blanket during the preparation of the primer composition, the process is simplified by eliminating various equipment, additional steps and complications associated with maintaining and mixing components under a nitrogen blanket. Accordingly, the primer compositions of the invention can be prepared more quickly and at a lower cost. Further conventional production lines can be readily converted to produce this product.

The preparation of the primer compositions in accordance with the invention is further simplified because carbon black pigments are not used. In order to properly mix the carbon black pigments into the conventional primer compositions, high shear, high torque mixing apparatus are used. The primer compositions of the invention can be mixed using less shear and less torque, and generally require less complicated mixing apparatus which are easier to operate and require less maintenance. Steps associated with the procurement, handling, addition of and blending of carbon black pigments into the primer composition are completely eliminated, thereby further reducing the time and cost for preparing the primer compositions of the invention.

Another advantage related to the avoidance of organic solvent and carbon black pigments used in conventional primer compositions is that the aqueous based primer composition of the invention can be contained and dispensed from a plastic bottle having a flexible reticulated applicator such as a sponge rubber applicator or brush. The conventional organic based primer compositions cannot generally be contained in a plastic bottle because the organic solvents will tend to attack the container. A sponge rubber or other flexible reticulated applicator cannot generally be used for applying conventional primer compositions because the carbon black pigments would tend to plug the reticulations of the applicator.

In addition to the foregoing advantages, the primer compositions of the invention have been unexpectedly found to react more quickly with glass or metal substrates than conventional primer systems. Thus, while it would be expected that production processes involving the use of the aqueous primer solutions of the invention would be slowed down because of the longer time periods required to dry water as compared to the drying times of volatile organic solvents, surprisingly, it has been found that the silane coupling agents in the aqueous primer solution react very quickly with the surface of the substrate so that, for example, after about 1 minute, a sufficient quantity of the silane coupling agent will have bonded with the substrate. The water can then be removed as by blowing air or wiping with an absorbent fabric or other material, leaving behind a sufficient quantity of silane coupling agent uniformly dispersed on the surface of the substrate to promote good bonding of a polymer coating to the substrate.

Another unexpected advantage of the invention which has been discovered is that after the primer has been applied to the substrate, it is possible to delay application of the polymeric coating for up to several months without experiencing any deleterious effects. This compares very favorably with conventional primer systems wherein the polymeric coating must generally be applied within about 30 minutes after the primer has been applied in order to achieve satisfactory adhesion between the primer and the coating. This extended open time between the application of the primer and the coating allows for greater manufacturing flexibility and essentially eliminates any duplication of effort due to unavoidable or inadvertent delays between the time the primer is applied to the substrate and the time the coating is applied to the substrate.

Surprisingly, it was also discovered that primer compositions of the invention enhance adhesion between butyl tape and glass. Butyl tape is typically used in the automotive glazing business to temporarily hold replacement windows firmly in position thereby allowing the vehicle to be driven before the sealant has fully cured. Butyl tape is generally composed of from 5 percent to 25 percent by weight of polybutene, 5 percent to 25 percent paraffinic oil, 5 percent to 20 percent butyl rubber, 0.1 to 10 percent tackifying resin, 0 to 50 percent talc, 0 to 50 percent calcium carbonate, and 1 to 15 percent carbon black.

DETAILED DESCRIPTION OF THE INVENTION

The primer system of the present invention is a multi component system depending on the application, but in particular includes water as a carrier and a silane coupling agent. For certain applications it also includes a hydrophobic agent which is, for example, a functionalized alkylsilane. The hydrophobic agent is used in applications in which water resistance properties are important. In addition, the system may include an optional surfactant which is preferably a nonionic surfactant. The surfactant is used to permit wetting of the substrate by the primer solution. In addition, where stability is of importance, an acid is used in order to inhibit condensation or oligomerization of the coupling agent. Other additives may be added to the extent that they are compatible with the system. Examples of additives which might be desirable include corrosion inhibitors and UV radiation stabilizers.

The silane coupling agent which is useful in the present invention, may be represented by the formula $$A—R^1—Si(R^2)_a(X)_{3-a}$$

wherein A is amino or mercapto functional group, $R^1$ is an alkylene radical having from 1 to about 8 carbon atoms each, $R^2$ is independently an alkyl radical having from 1 to about 8 carbon atoms, each X is independently an alkoxy radical having from 1 to about 8 carbon atoms or chlorine and a is 0, 1 or 2. Preferably A is an amino group, $R^1$ is a propyl group, $R^2$ is a methyl group, X is a methoxy or ethoxy group, and a is 0 or 1, and most preferably X is methoxy or ethoxy and a is 0. A particularly suitable aminosilane is γ-aminopropyltriethoxysilane (γ-APS.) The aminosilane is used at from about 0.05 to about 0.3 parts, more preferably from about 0.1 to about 0.25 parts, and most preferably from about 0.1 to about 0.2 parts, these parts being based on 100 parts water.

The hydrophobic agent is an optional ingredient which resists moisture and inhibits dissociation upon exposure to water. A suitable hydrophobic agent is a functionalized hydrocarbylsilane. In general, the silane has the formula $$(R^3)_bSi(Y)_{4-b}$$

where each $R^3$ is independently an alkyl, alkenyl or aryl radical having up to about 8 carbon atoms, each Y is independently an alkoxy radical having up to about 8 carbon atoms or chlorine, and b is 1 or 2. Preferably $R^3$ is methyl, X is methoxy or ethoxy and b is 1. A particularly preferred composition is methyltrimethoxysilane (MTMS). This particular hydrophobic coupling agent unexpectly exhibits corrosion inhibitor properties, for example, in the pinchweld of a car for windshield applications. The hydrophobic coupling agent is used in an amount of from more than 0 to about 0.4 parts, preferably from about 0.15 to 0.3 parts, and most preferably from about 0.15 to 0.25 parts by weight based on 100 parts water. In this context, from more than 0 parts means some minimal amount at which the agent has a perceptible effect.

In addition, an optional surfactant which is preferably a nonionic surfactant is used in an amount which is effective to permit wetting of the substrate but not so great as to interfere with the silanol bonding. A suitable nonionic surfactant is sold under the trademark "TERGITOL TMN-6." This particular surfactant may be used at a small percentage, from about 0.01 to 0.05, and more preferably about 0.02 to about 0.04 parts or percent.

In addition, an acid is used to impart stability to the system. Suitable acids include acetic acid and hydrochloric acid, although other inorganic or organic acids such as other carboxylic acids can be used. The acid is used in an amount effective to adjust the pH to from about 2 to about 5.5, preferably from about 3.5 to about 4.5, and most preferably from about 3.75 to about 4.25. The acid is believed to help promote hydrolysis of the alkoxy groups and inhibits the self catalyzed condensation of the silanol groups.

In order to permit application of the primer composition at temperatures below 32° F. and/or to decrease drying time, various water soluble solvents, such as isopropyl alcohol or acetone, can be added.

Water is used as the carrier for the primer and is preferably deionized water.

The primer is made by mixing the ingredients in a suitable container such as a plastic or plastic lined container. An example of a suitable plastic is polyolefin such as polyethylene or polypropylene or copolymers or blends containing the same. The silanes are added to the water after the pH has been appropriately adjusted. Agitation is used to induce the silanes into solution.

The primer of the present invention is particularly suitable for use with windshield sealant systems. These windshields may include automobile, truck, and off-the-road windshields as well as aircraft and marine windshields. The system when used with a glass substrate and a suitable sealant, such as polyurethane, complies with current OEM automotive specifications, i.e., it achieves a lap shear strength of at least 500 psi (derived in accordance with SAE J1529) and maintains adhesion under water immersion testing for 10 days.

The primer of the present invention may be used with various nonporous substrates. For purposes of this specification, nonporous means that liquids will not penetrate the surface of the substrate. Examples of suitable substrates include glass, metal, coated metal porcelain, ceramic, granite, nonporous concrete, other nonporous siliceous or metallic materials, and the like. The primer composition is particularly well suited for use with metals having an automotive topcoat and for use with normal float glass. Typically windshield glass will include a dark ceramic frit to provide protection from ultraviolet light.

Sealants which are effective include moisture curable sealants, caulks and putties and in particular, are suitable for compositions which will bond with the functional group of the silane coupling agent. For example, the amine group of aminopropyltriethoxysilane can react with a free isocyanate group from a polyurethane polymer to form a urea linkage. Polymer compositions which can be used with the primer composition of the invention include generally any polymers having terminal or pendant functional groups which will react with the amino or mercapto functional groups of the disclosed silane coupling agents. Examples of functional groups of the polymer which will react with the amino or mercapto groups of the disclosed silanes include isocyanate groups, epoxy groups, and acetoacetate groups. In particular, the primer composition of the invention can be used to promote good adhesion between a nonporous substrate and various moisture curable polyurethane prepolymer sealant compositions having free isocyanate groups. Examples of such compositions are well known to the art and to the literature and can be found, for example, in U.S. Pat. Nos. 4,625,012, 4,758,648, and 4,780,520.

A plastic applicator bottle can be advantageously used for dispensing the primer compositions of the invention. A saturation type applicator, similar to a "shoe-polished type" bottle having a saturation applicator, can be used. The applicator bottle includes a flexible conduit connecting the reservoir portion of the bottle to the applicator. The flexible conduit preferably has an internal wall generally transverse to the direction of flow, with the wall having a slit or cut which acts as a valve. When the flexible conduit is unstressed, the slit generally remains closed and prevents the primer composition from flowing out, even when the bottle is inverted.

A small amount of force applied to the conduit causes the slit to open and allows the primer composition to flow to the attached applicator. The applicator is a saturation application such as a sponge or sponge like mass having an absorbent, flexible and porous or reticulated structure. The outer surface of the applicator is preferably provided with a soft, thin layer, such as a napped fabric layer, to provide a soft, nonabrasive surface for applying the primer composition to a substrate.

Suitable plastic materials for the bottle include polyolefins such as high density polyethylene. The conduit can be made from flexible plastics or rubbers such as ethylene-propylene-diene rubber. The application can generally be made from known sponge rubber materials and the thin, soft layer can be a felt or flocked material suitably secured to the sponge rubber material with adhesives. Again, it is an advantage that the present invention permits the use of adhesives.

The plastic bottle is preferably provided with external threads to which a cap can be screwed over the applicator to reduce evaporation of the primer composition when not in use.

The applicator bottle can be used to apply the primer composition to the area near the edges of a windshield where a polymeric sealant composition is to be applied.

In order to obtain the best results, it is highly recommended and preferred that the nonporous substrate, to which the polymer composition is to be bound with the aid of the disclosed primer composition, be thoroughly cleaned prior to application of the primer. It is recommended that the substrate be thoroughly cleaned such as with soap and water or with an ammonia solution, or with solvents such as acetone, isopropyl alcohol, or methylethylketone to remove all contaminates such as oil, metal oxides, dirt and dust from the substrate. Such contaminants tend to block primer from the substrate surface causing the coupling agent to bond to the contaminant and/or preventing the coupling agent to bond to the substrate.

The primer is typically applied so as to wet the that the entire area of the substrate to which the polymer composition is to be bonded. It is recommended that the primer be applied at a temperature above 32° F. and that it be allowed to dry before application of the polymer composition. While the polymer can be applied to a primed substrate when the surface is still damp, it has been found that undue excess liquid such as primer pools or beads of water can prevent the polymer from contacting the glass which can result in reduced adhesive strength between the polymer and the substrate.

Upon curing, the sealant system forms a unified laminate, or gradient product wherein the primer forms an interface or bridge between the substrate and the sealant. It is believed that this interface is formed by covalent bonding, but other mechanisms may be involved. The "unified laminate" thus refers to the substrate, the primer interface, and the sealant. By "laminate" it is intended to imply that the substrate and the sealant are unified but discrete layers, and that the silane coupling agent is chemically and/or mechanically bound at the interface. However, this term is not intended to limit the invention in any way.

In particular, the sealant system is applicable as a windshield sealant system. It is also applicable to the construction of glazed windows and generally any other application wherein a sealant is applied between two smooth nonporous surfaces.

A better understanding of the present invention and its many advantages will be had from the following examples which are intended to illustrate, but not limit, the invention.

EXAMPLE 1

Primer samples were made in accordance with the recipe set forth in Table 1. The water was added first to a quart glass jar. The acid was added to modify the pH of the solution to between about 3.5 and 4.5.

Generally the surfactant was added thereafter, and then the silane coupling agent ($\gamma$-APS) and the hydrophobic agent (MTMS) were added. The jar was capped with a metal lid and was vigorously manually agitated for more than 5 minutes. The composition was left to equilibrate and fully hydrolyze for at least 30 minutes prior to application.

For samples in which shelf-life or stability was not being tested, the composition was stored at room temperature, in the same capped container. For stability studies, the primer was transferred to two ounce glass jars, capped with the appropriate metal lid, and subjected to the conditions as indicated hereinafter.

TABLE I

|  | Parts |
|---|---|
| Deionized water | 100 |
| TERGITOL TMN-6 | .03 |
| (nonionic surfactant sold by Union Carbide) |  |
| Glacial acetic acid | .09 |
| $\gamma$-aminopropyltriethoxysilane |  |
| (sold under the trademark A1100 by Union Carbide) | .15 |
| Methyltrimethoxysilane |  |
| (sold under the trademark A163 by Union Carbide) | .30 |

Lap shear specimens were prepared and tested as follows.

Pieces of two-ply automotive glass and glass slides (4"×1") were washed with Triton-X soap and then thoroughly rinsed with tap water. The glass was then soaked in a caustic bath for 1 hour and thoroughly rinsed. Finally, the glass was triple rinsed with methylethylketone and left to dry. A thin layer of primer was then brush applied to both lap shear substrates and allowed to dry for 10 minutes. It should be noted that all the primers were reasonably dry after 10 minutes. A bead of an isocyanate terminated polyether polyurethane sold by Tremco under the trademark "Trem-Shield 600" was then applied and the glass samples were assembled to standard lap shear geometry. The substrate contact area was kept as close to 0.25"×1" as possible; it was found that larger beads tend to cure less thoroughly and yield substantially lower rupture values. The beads were squared using a razor blade to permit the maximum amount of moisture penetration and therefore most rapid cure time. Samples were maintained at 75° F. and 50 percent R.H. for 5 days prior to testing.

Samples were tested on an Instron model 1130 at a crosshead speed of 1 inch/minute. A 1000 lb. load cell was used on the 200 lb. full scale setting. Following rupture the sealant/substrate contact area was measured and the mode of failure (adhesive or cohesive) was recorded.

Two to six specimens were tested per sample and the results are set forth in Table II.

The test results summarized in Table II generally show how the primer of the invention performs under a variety of adverse conditions and application techniques. Tests 1 and 2 show that lap shear strength is greatly improved when the primer of the invention is used and that adhesive failure does not occur. Test 3 shows that a 12 week delay between the time the primer is applied and the time the sealant is applied does not significantly affect lap shear strength. Test 4 shows that when the primer is exposed to a temperature of 120° F. for a period of 1 week prior to application of the primer to the specimen, lap shear strength is substantially unaffected. For test 5 the primer was subjected to four freeze-thaw cycles between −40° F. to 90° F. before the primer was used to prepare specimens. The results show that the primer performance is substantially unaffected by temperature cycling and that the primer is not likely to become damaged during shipping or storage due to the weather. Tests 6 and 7 respectively show that the addition of isopropyl alcohol and acetone, to decrease drying time and to protect against freezing, do not affect primer performance. Tests 8 and 9 indicate that the primer can be applied and wiped at any temperature between 40° F. and 90° F. without any significant effect on performance. Tests 10 and 11 show that inadvertent exposure of surfaces primed with the invention to solvents such as methylethylketone and isopropyl alcohol do not significantly affect primer performance. Tests 12 and 13 show, respectively, that prolonged exposure (1 week) to very high temperature (120° F.), and to simultaneous high temperature (100° F.) and high humidity (100% R.H.) conditions do not significantly affect primer performance. Test 14 indicates that some adhesive failure (25%) occurs when lap shear is tested on specimens at −2° C. However, the lap shear is still very good (364±100 psi) and exceeds most automotive specifications. Test 15 shows that when the primer is applied over a dried ammonium based glass cleaner primer performance is substantially unaffected. Test 16 shows that the primer is highly resistant to attack by water and that even after being immersed in water for a period of two weeks the primer still performs well and inhibits adhesive failure. Test 17 shows that even if the sealant is applied while the primer is wet, there is still no significant adverse affect on primer performance.

TABLE II

Lap shear strengths for Primer 500.
All test performed on glass substrates unless otherwise noted.

| TEST NO. | CONDITION | DURATION | STRENGTH (PSI) | FAILURE MODE | COMMENTS |
|---|---|---|---|---|---|
| 1 | Unprimed Specimen | — | 33 ± 5 | Adhesive | Control |
| 2 | Primed specimen | — | 505 ± 34 | Cohesive | Control |
| 3 | Open Time | 12 wks | 425 ± 50 | Cohesive | — |
| 4 | Primer Heat Aged at 120° F. | 1 wk | 441 ± 97 | Cohesive | Primer stability |
| 5 | 4 Freeze-Thaw Cycles, −40 to 90° F. | — | 466 ± 43 | Cohesive | Primer stability |
| 6 | 76% Primer + 24% IPA by wt. | — | 492 ± 36 | Cohesive | Lowers dry time and freeze point |
| 7 | 76% Primer + 24% acetone by wt. | — | 488 ± 36 | Cohesive | Lowers dry time |
| 8 | 2 minute dry wipe at 75° F. | — | 514 ± 40 | Cohesive | Eliminates dry time |
| 9 | 2 minute dry wipe at 40° F. | — | 511 ± 29 | Cohesive | Eliminates dry time |
| 10 | MEK wipe after application 1 day after application | — | 461 ± 68 | Cohesive | Stability of film with solvent wipe |
| 11 | IPA wipe after application | — | 445 ± 30 | Cohesive | Stability of film with solvent wipe |
| 12 | Specimens heat aged at 120° F. | 1 wk | 492 ± 26 | Cohesive | Heat stability after application |
| 13 | 100° F./100% R.H. | 1 wk. | 500 ± 18 | Cohesive | Stability in humidity |
| 14 | Tested at −2° C. | — | 364 ± 100 | 75% cohesive | Ability to accommodate loads at low temperature |
| 15 | Primer on "Sparkle" glass cleaner | — | 474 ± 25 | Cohesive | Film strength over deposited glass cleaner |
| 16 | Specimens immersed in H₂O | 2 wks | 454 ± 46 | Cohesive | Hydrolytic stability |
| 17 | Sealant applied prior to primer drying | — | 477 ± 32 | Cohesive | Effect of potential weak boundary layer |

EXAMPLE 2

The primer made in accordance with Example 1 was tested in comparison with a conventional organic solvent base primer. The conventional primer has about 85 percent solvents, about 5–10 percent film former, about 1–5 percent carbon black pigment, and about 5–10 percent of an amino aliphatic siloxane coupling agent having both a primary and secondary amine and straight chain alkyls in the aliphatic portion. Lap-shear specimens were made as described except that adhesion was determined for samples made with identical top and bottom substrates to isolate the adhesion values for both glass and automotive top coat on metal. The results are set forth in Table III.

TABLE III

| | CONTROL | | HEAT AGE @ 120° F. 1 WEEK | | 100° F./100% R.H. 1 WEEK * | | WATER SOAK (4 DAYS)+ 70° C. (3 DAYS) | |
|---|---|---|---|---|---|---|---|---|
| | GLASS | TOPCOAT | GLASS | TOPCOAT | GLASS | TOPCOAT | GLASS | TOPCOAT |
| Convention Organic Primer | 319 ± 84 60% C | 193 ± 5 0% C | 477 ± 36 100% C | 345 ± 61 35% C | 80 ± 14 0% C | 325 ± 16 45% C | 267 ± 63 70% C | 207 ± 28 0% C |
| Aqueous Primer of Invention | 475 ± 12 100% C | 470 ± 18 100% C | 464 ± 18 100% C | 428 ± 72 85% C | 500 ± 18 100% C | 465 ± 19 100% C | 454 ± 46 95% C | 440 ± 15 100% C |

* Sample dried 3 hours at 75° F./50% R.H. prior to testing.
C denotes cohesive failure
0% C means 100% adhesive failure The results shown in Table III generally indicate that the aqueous primer composition in accordance with the invention performs significantly better and with greater consistency than conventional organic based primers. In particular, the results show that the primer of the invention promotes better adhesion between a glass substrate and a typical urethane sealant and between an automotive top coated metal substrate and the typical polyurethane sealant. The results also indicate that the invention performs better than conventional primers after prolonged exposure to heat and water. The primer of the invention performs much better than conventional organic primers when applied to glass and simultaneously exposed to high temperature and humidity.

EXAMPLE 3

The primers listed in Table IV were applied to windshield glass and Tremshield was then applied and cured for 5 days. The samples were then immersed in water and inspected daily for adhesion by peeling the bead.

The results are set forth in Table IV, and generally indicate that the ability of the primers of the invention to resist attack by water is greatly improved by adding a small amount (for example, 0.3% by weight of the total primer solution) of methyltrimethoxysilane as a hydrophobic agent.

TABLE IV

| DAYS | 1.5 | 2 | 3 | 4 | 5 | 6 | 7 |
|---|---|---|---|---|---|---|---|
| 2% Hydrosil 2627, A sold by Hüls-America, Inc. | F | | | | | | |
| .3% MTMS; .15% γ-APS, .03% Tergitol TMN-6 surfactant | P | P | P | P | P | P | P |
| .3% MTMS, .15% γ-APS without surfactant | P | P | P | P | P | P | P |
| .15% γ-APS without hydrophobic agent and without surfactant | P | F | | | | | |
| .15% γ-APS .03% Tergitol TMN-6 without hydrophobic agent | F | | | | | | |
| .3% VTES, .15% γ-APS | P | P | P | P | P | P | P |
| .3% VTES, .15% γ-APS .03% Tergitol TMN-6 | P | P | P | P | P | P | P |

P - Pass means cohesive failure was observed
F - Fail means adhesive failure was observed
γ-APS - aminopropyltriethyoxysilane coupling agent
MTMS - methyltrimethyoxysilane hydrophobic agent
VTES - vinyltriethyoxysilane

EXAMPLE 4

Commercial scale samples were prepared using the previously described primer formula and process for preparation except that the composition was prepared in a 50 gallon vessel with motor driver metal blades while maintaining the same addition sequence and proportions for raw materials. Ten commercial batches comprising 500 gallons total were prepared and were batch inspected for adhesion, pH and ability to wet substrate samples, e.g. windshields. No discrepancies were observed between the bench top samples and the commercial scale samples.

Primers samples were packaged in a saturation type applicator, i.e. a "shoe-polish-type" bottle, and distributed to about 15–20 glass shops for controlled field trials in windshield replacement. The results were uniformly successful.

CONCLUSION

The experimental results show that the aqueous-based primer compositions of the invention perform as well or better than convention organic-based primers under a wide variety of conditions and provide an attractive alternative which is environmentally friendly and in compliance with pending VOC legislation.

While in accordance with the Patent Statutes, the best mode and preferred embodiment has been set forth, the scope of the invention is not limited thereto, but rather by the scope of the attached claims.

What is claimed is:

1. An aqueous primer composition for facilitating adhesion across an interface between a nonporous substrate and a polymeric composition, comprising:
   a) 100 parts by weight of water;
   b) from about 0.05 to about 0.3 parts by weight of a silane coupling agent, the silane coupling agent being represented by the formula $$A-R^1-Si(R^3)_a(X)_{3-2}$$

where A is an amino or mercapto functional group, $R^1$ is an alkylene radical having from 1 to about 8 carbon atoms, each $R^2$ is independently an alkyl having from 1 to about 8 carbon atoms, each X is independently an alkoxy radical having from 1 to about 8 carbon atoms or chlorine, and a is 0, 1 or 2; and
   c) from about 0.1 no about 0.4 parts by weight of a hydrophobic silane per 100 parts of the aqueous solution containing the silane coupling agent, the hydrophobic silane being represented by the formula $$(R^3)_b Si(Y)_{4-b}$$

where each $R^3$ is independently an alkyl, alkenyl or aryl radical having up to about 8 carbon atoms, each Y is independently an alkoxy radical having up to about 8 carbon atoms or chlorine, and b is 1 or 2.

2. The primer composition of claim 1, wherein $R^1$ is a propylene radical, each $R^2$ is independently a methyl, ethyl or propyl radical, each X is independently a methoxy or ethoxy radical, each $R^3$ is independently a methyl, ethyl or propyl radical, and each Y is independently a methoxy or ethoxy radical.

3. The primer composition of claim 2, further comprising an effective amount of a surfactant to allow for the primer composition to wet the surface of a nonporous substrate.

4. The primer composition of claim 2, wherein the pH of the aqueous primer composition is in the range from about 2.0 to about 5.5.

5. The primer composition of claim 4, wherein the silane coupling agent is aminopropyltriethoxysilane.

6. The primer composition of claim 4, wherein the hydrophobic silane is methyltrimethoxysilane.

7. The primer composition of claim 1, wherein the composition is contained in and dispensable from a plastic applicator bottle.

8. The primer composition of claim 7, wherein the applicator bottle includes a flexible reticulated applicator connected to the bottle by a flexible conduit.

9. The primer composition of claim 8, wherein the flexible conduit has a wall generally transverse to the direction of flow, the wall having a slit which acts as a valve and is operable by flexing the conduit.

* * * * *